(12) United States Patent
Posti

(10) Patent No.: US 7,035,360 B2
(45) Date of Patent: Apr. 25, 2006

(54) DEVICE AND METHOD FOR REDUCING THE AMPLITUDE OF SIGNALS

(75) Inventor: Harri Posti, Oulu (FI)

(73) Assignee: Nokia Corporation, Espoo (FI)

(*) Notice: Subject to any disclaimer, the term of this patent is extended or adjusted under 35 U.S.C. 154(b) by 628 days.

(21) Appl. No.: 09/875,335

(22) Filed: Jun. 6, 2001

(65) Prior Publication Data

US 2002/0054651 A1 May 9, 2002

Related U.S. Application Data

(63) Continuation of application No. PCT/EP98/08446, filed on Dec. 24, 1998.

(51) Int. Cl.
*H04B 1/10* (2006.01)

(52) U.S. Cl. ........................................................ 375/350

(58) Field of Classification Search ................ 375/136, 375/147, 316, 340, 343, 347, 349, 350, 310, 375/335, 337, 339, 143, 344; 455/132, 133, 455/134, 135, 137, 149, 178.1, 189.1, 209, 455/225, 226.1, 226.2, 249.1, 3.1, 307, 339, 455/434, 421, 552; 379/56.2

See application file for complete search history.

(56) References Cited

U.S. PATENT DOCUMENTS

| | | | | |
|---|---|---|---|---|
| 3,783,397 A | * | 1/1974 | Dishal et al. | 327/47 |
| 5,590,156 A | | 12/1996 | Carney | |
| 5,625,871 A | | 4/1997 | Myer et al. | |
| 5,710,995 A | * | 1/1998 | Akaiwa et al. | 455/277.2 |
| 5,852,651 A | * | 12/1998 | Fischer et al. | 379/56.2 |
| 5,960,336 A | * | 9/1999 | Ikawa et al. | 455/277.2 |
| 6,018,555 A | * | 1/2000 | Mahany | 375/347 |
| 6,018,647 A | * | 1/2000 | Fitzgerald | 455/135 |
| 6,088,569 A | * | 7/2000 | Bach et al. | 725/149 |
| 6,118,773 A | * | 9/2000 | Todd | 370/334 |
| 6,226,507 B1 | * | 5/2001 | Ramesh et al. | 455/277.1 |
| 6,553,229 B1 | * | 4/2003 | Dent | 455/434 |

FOREIGN PATENT DOCUMENTS

| | | |
|---|---|---|
| EP | 0372369 A2 | 6/1990 |
| EP | 0704983 A2 | 4/1996 |
| EP | 0704992 A2 | 4/1996 |

OTHER PUBLICATIONS

International Search Report for PCT/EP98/08446.

* cited by examiner

Primary Examiner—Emmanuel Bayard
(74) Attorney, Agent, or Firm—Squire, Sanders, Dempsey, LLP

(57) ABSTRACT

A receiver receives a plurality of different signals at the same time. The receiver comprises means for identifying at least one strongest signal of said plurality of different signals and a filter for attenuating said at least one strongest signal with respect to the other of said plurality of signals.

19 Claims, 5 Drawing Sheets

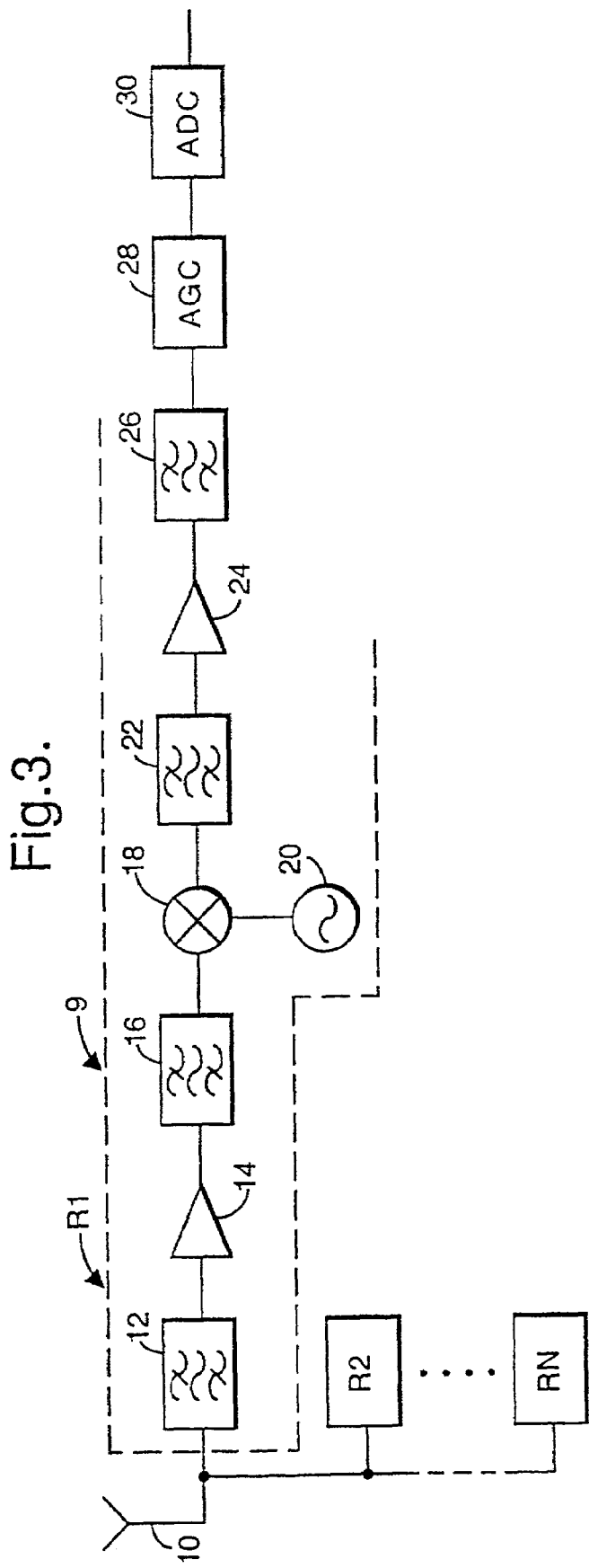

DEVICE AND METHOD FOR REDUCING THE AMPLITUDE OF SIGNALS

This application is a continuation of PCT/EP98/08446 filed on Dec. 24, 1998.

The present invention relates to a device and a method for reducing the amplitude of signals. In particular, but not exclusively, the device and method can be used in the receiver for a wireless telecommunications network.

FIG. 1 illustrates a known wireless telecommunication network 2. The area covered by the network 2 is divided into a number of cells 4. Each cell has associated therewith a base transceiver station 6. Each base transceiver station 6 is arranged to communicate with terminals a located in the cell 4 associated with that base transceiver station 6. The terminals 8 may be mobile stations which are able to move between the cells.

Each base transceiver station is, in the GSM standard (Global System for Mobile Communications), arranged to receive M channels out of N available channels C1 . . . CN as illustrated in FIG. 2a. This is because GSM uses a frequency division multiple access technique. The N channels C1 . . . CN occupy a bandwidth of XMHz. Each channel therefore has a spacing of X/N MHz. This is 200 KHz in the GSM standard. Each channel is divided into frames F one of which is shown in FIG. 2b. Each frame is divided into 8 slots S1 . . . S8. The GSM standard is a frequency/time division multiple access (F/TDMA) system and accordingly different mobile stations will be allocated different time slots for a given frequency. Thus, the base transceiver station will receive signals from different mobile stations in different time slots at the same frequency. M is usually much less than N.

Reference is made to FIG. 3 which shows part of the known base transceiver station 9 which is arranged to receive N channels at the same time. For clarity, only the receiving part of the base transceiver station 9 is shown. The base transceiver station 9 has an antenna 10 which is arranged to receive signals from mobile stations in the cell served by the base transceiver station 9. The base transceiver station comprises N receivers R1, R2 . . . RN. Thus one receiver is provided for each frequency which is to be received by the base station 9. All of the receivers R1–RN have the same construction and accordingly the components of the first receiver R1 only are shown. The first receiver R1 comprises a first bandpass filter 12 which is arranged to filter out signals which fall outside the bandwidth in which the M available channels are located. The filtered output is input to a first low noise amplifier 14 which amplifies the receive signals. The amplified signal is then passed through a second bandpass filter 16 which filters out any noise, such as harmonics or the like introduced by the first amplifier 14.

The output of the second bandpass filter is connected to a mixer 18 which receives a second input from a local oscillator 20. The frequency of the output of the local oscillator 20 will depend on the frequency of the channel allocated to a particular receiver. The output of the second bandpass filter 16 is mixed with the output of the local oscillator 20 to provide a radio signal at an intermediate frequency IF, which is less than the radio frequency at which the signals are received. The intermediate frequency IF output by the mixer 18 of each receiver will be the same for all receivers and may, for example, be 180 MHz. For example, if the channel allocated to a given receiver has a frequency of 880 MHz then the local oscillator 20 of that receiver will be tuned to 700 MHz. On the other hand, if the channel allocated to a given receiver has a frequency of 900 MHz, then the local oscillator will be tuned to a frequency of 720 MHz.

The output of the mixer 18 is input to a third bandpass filter 22 which filters out any noise and unwanted mixing products introduced by the mixer 18. The output of the third bandpass filter 22 is amplified by a second amplifier 24 and output to a further bandpass filter 26. The further bandpass filter 26 filters out all signals except that of the channel allocated to the particular receiver. In other words, all the channels received by the antenna 10 with the exception of the channel allocated to the receiver R1 will be filtered out by the further bandpass filter 26. The output of the further bandpass filter 26 is connected to an automatic gain control unit 28 which alters the gain of the signal so that it falls within the dynamic range of an analogue to digital converter 30.

One problem with the known architecture is that it is necessary to provide a receiver for each channel.

With the known networks, the base transceiver station is required to receive signals from mobile stations 8 which are very close to the base transceiver station as well as from mobile stations 8 which are on the edge of a cell. Accordingly, the strength of the signals received by the base transceiver station will vary a great deal, depending on the distance of the mobile station and the base station.

A relatively large variation in amplitude of signals received from the mobile stations at the base transceiver station gives rise to a number of difficulties in the receiver. If a single receiver were to be used with signals from more than one channel, amplifiers would have to amplify all of the received signals by the same amount at a given time including the signals with a larger amplitude and those of a smaller amplitude. The larger signals may therefore fall outside the dynamic range of the analogue to digital converter which may cause the analogue to digital converter to become saturated which leads to distortion. Typically, the distortion will take the form of intermodulation distortion which generates intermodulation product signals. This interference can interfere with the signals received on other channels. If a lower amplification is used, this may result in the smaller signals being lost or swamped by background noise.

U.S. Pat. No. 5,590,156 discloses a technique for extending the dynamic range available in a wide band digital base station. The base station has two receivers. One receiver has a high gain and is intended for weak signals and the other receiver has a lower gain and is meant for stronger signals. These two receivers are allocated different frequency bands. The more distant mobile stations are allocated the frequency band used by the receiver having the high gain whilst the mobile stations close to the base transceiver station are allocated the frequency band used by the receiver with the low gain. This solution requires the base station to provide a channel allocation function. Additionally, two different receivers are still required.

It is therefore an aim of embodiments of the present invention to reduce or at least mitigate the problems of the known systems.

According to one aspect of the present invention, there is provided a receiver for receiving a plurality of different signals at the same time, said receiver comprising means for identifying at least one strongest signal of said plurality of different signals and a filter for attenuating said at least one strongest signal with respect to the other of said plurality of signals.

Preferably, the plurality of different signals are at different frequencies.

Preferably, the filter is a notch filter. The receive may be arranged so that the strongest signal is centred on the stopband of the notch filter and thus attenuated. It is preferred that the notch filter not attenuate any adjacent signals.

Preferably, an analogue to digital converter is coupled to the output of the filter, whereby the at least one strongest signal is in the dynamic range of the analogue to digital converter after being attenuated by the filter. Thus, problems of the prior art may be avoided.

Preferably, a downconverter unit is provided for down converting said signals and the identifying means comprises means for measuring the strength of the signals at the baseband. Preferably an analogue to digital converter is provided, the digital output of the analogue to digital converter being coupled to the input of the identifying means and the identifying means comprising means for measuring the strength of the digital signals from the analogue to digital converter. This analogue to digital converter is generally different to the analogue to digital converter coupled to the output of the filter.

Preferably, there is an input for receiving said signals, a splitter for dividing said input signals, said splitter comprising a first output coupled to said identifying means and a second output coupled to a main signal path which includes said filter. The second path is preferably dedicated to the identifying means and providing the identifying means with the necessary signals. Preferably, the splitter is arranged so that the signals on the first output are much weaker than the signals on the second output. The splitter therefore may preferably be a coupler.

A downconverter unit may be provided for down converting the received signals to an intermediate frequency range, said downconverter unit being arranged to receive a control signal from said identifying means for determining said intermediate frequency range, whereby said intermediate frequency range is determined by said identifying means based on the frequency of the strongest signal. This downconverter unit is preferably on the main signal path and is different from the downconverter unit discussed hereinbefore.

Preferably, a second downconverter unit is provided for down converting the received signals to a predetermined second intermediate frequency range which is lower than said first intermediate frequency range, said identifying means being arranged to provide a control signal for controlling the second downconverter unit so that the output of the second downconverter unit falls within the predetermined range. In preferred embodiments, there are thus two intermediate frequencies used in the main path. The first intermediate frequency range can vary but the second intermediate frequency range is preferably fixed.

At least one of the first and second downconverter units preferably comprises an oscillator which is arranged to provide a down conversion signal and the frequency of the down conversion signal is controlled by the identifying means. The frequency of the down conversion signal may determine the intermediate frequency ranges.

The identifying means may comprise a first part for separating said signals and a second part for, identifying the at least one strongest signal. The second part also preferably generates the control signals discussed hereinbefore.

The first part may comprise a Fast Fourier Transform unit for separating the signals or in alternative embodiments of the present invention may comprise a digital downconverter for converting the signals to the baseband. The digital downconverter may comprise an oscillator, the frequency of which is altered to provide each of the pluralities of signals at the baseband. In an alternative embodiment, a plurality of downconverters are provided, each downconverter being arranged to convert signals within different frequency ranges to the baseband. Each downconverter may have a single channel frequency with which it deals or alternatively, each downconverter may deal with a subrange of the total bandwidth in which signals can be received. In the latter case, the downconverters may be able to provide baseband signals for a number of different frequencies.

Embodiments of the present invention are preferably incorporated in a base transceiver station for example for use in a cellular telecommunications network.

For a better understanding of the present invention and as to how the same may be carried into effect, reference will now be made by way of example to the accompanying drawings in which:

FIG. 3 shows the known receiving part of a base transceiver station;

Figure 1:
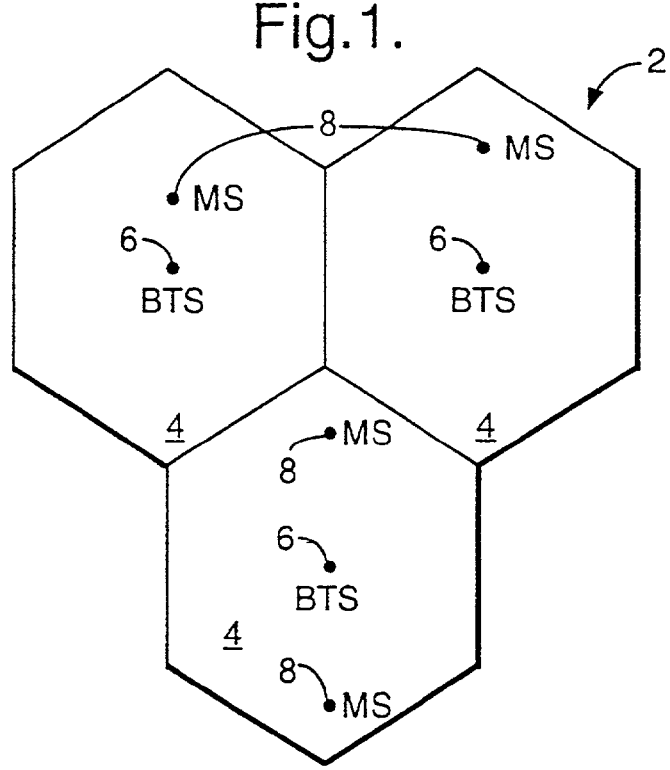
FIG. 1 shows the typical wireless cellular telecommunications network.
Figure 2A:
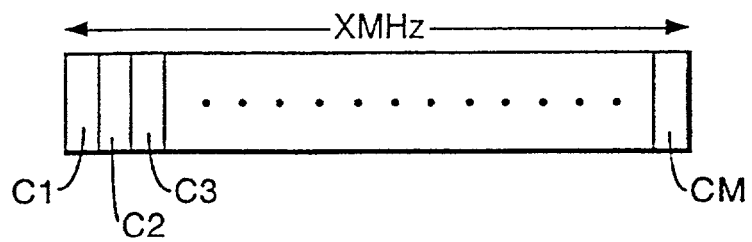
FIG. 2a shows an example of channels receivable by a base transceiver station in a GSM system.
Figure 2B:
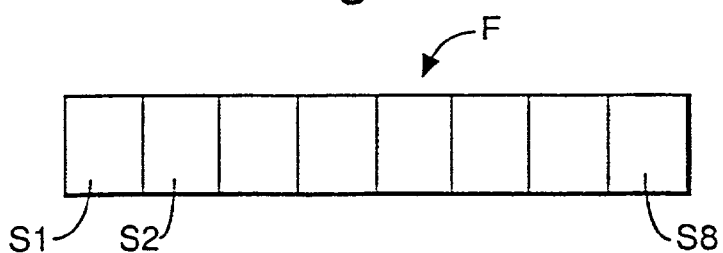
FIG. 2b shows a structure of a frame used on each channel.
Figure 4:
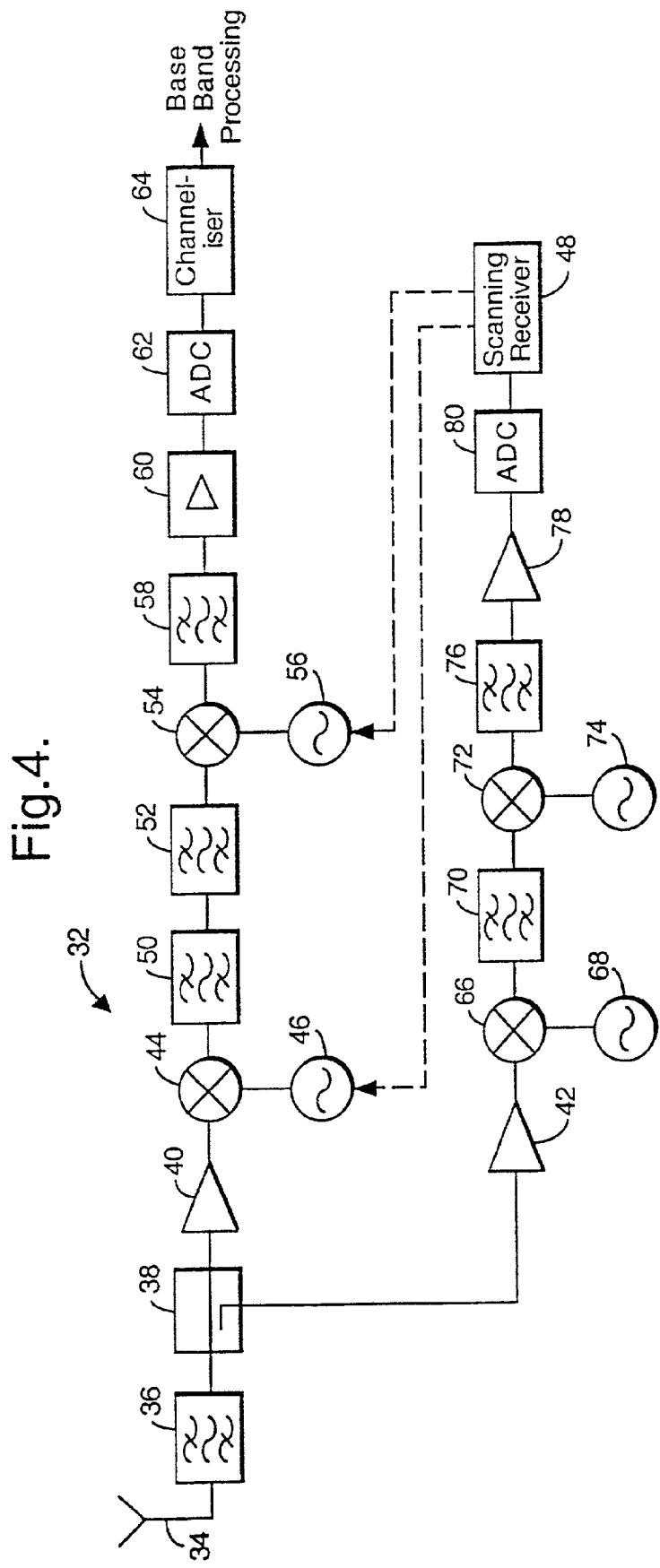
FIG. 4 shows the receiving part of a base transceiver station embodying the present invention.

Reference will now be made to FIG. 4 which illustrates the receiver part 32 of a base station embodying the present invention. Unlike the known base transceiver station, illustrated in FIG. 3, the base transceiver station embodying the present invention only has a single receiver 32 which deals with all the N channels to be received by the base transceiver station at the same time.

The receiving part 32 of the base transceiver station comprises an antenna 34 which receives signals from the mobile stations in the cell associated with the base transceiver station. The signal received by the antenna 34 will include a plurality of different channels at different frequencies. The embodiment of the present invention will be described in the context of a GSM system. However, it should be appreciated that embodiments of the present invention are applicable to any other suitable standard. The signals received by the antenna 34 are input to a first bandpass filter 36. The first bandpass 36 filters out any signals which fall outside the bandwidth in which the N channels are located. The filtered output is input to a coupler 38 which divides the signal into two parts. The stronger part of the signals is input to a first amplifier 40. The weaker output of the coupler 38 is input to a second amplifier 42. The path of the stronger output of the coupler 38 will now be described.

The first amplifier 40 amplifies the received signals. The amplified signals are input to a first mixer 44 which mixes the received signals, with a signal from a first local oscillator 46. The frequency of the first local oscillator 46 is set by a scanning receiver 48 and will be discussed in more detail hereinafter. The mixing of the received signals with a signal from the first local oscillator 46 by the first mixer 44 results in signals in a lower, intermediate frequency range. The intermediate frequency range is less than the radio frequency range of the signals received by the antenna 34.

The output of the first mixer 44 is input to a second bandpass filter 50. The second bandpass filter 50 filters out spurious mixer signals and other order signals without compromising the signals in the intermediate frequency range. The output of the second bandpass filter 50 is input to a notch filter 52. The notch filter has a predefined stopband. The signals falling within that predefined stopband frequency range are attenuated to reduce the dynamic range of the received signals. Signals outside the stopband frequency are unaffected. This will be described in more detail hereinafter. The output of the notch filter 52 is input to a second mixer 54 which mixes the output of the notch filter 52 with the output of a second local oscillator 56. Again, the frequency provided by the second local oscillator 56 is controlled by the scanning receiver 48. The output of the second mixer 54 is again in an intermediate frequency range which is lower than the intermediate frequency range output by the first mixer 44.

The output of the second mixer 54 is input to a third bandpass filter 58 which filters out spurious mixer signals and other order signals without compromising the signals in the second intermediate frequency range. The output of the third bandpass filter is input to a third amplifier 60 which amplifies the signals. The output of the third amplifier 60 is input to an analogue to digital converter 62 which converts the analogue signal to digital form.

The digital signals are output by the analogue to digital converter 62 to a channelizer 64 which separates the channels which are in the received signal to provide the N channels. The N channels are converted to the baseband and are subsequently processed in a conventional manner.

The weaker output of the coupler 38 is input to the second amplifier 42. The output of the second amplifier 42 is input to a third mixer 66 which mixes the radio frequency received signals with a signal from a fourth local oscillator 68 to provide signals in a third intermediate frequency range. This will be of a similar order to the first intermediate frequency range provided by the first mixer 44 but will not necessarily be the same. The frequency provided by the third local oscillator 68 is constant.

The output of the third mixer 66 is input to a fourth bandpass filter 70 which again filters out spurious mixer signals and other order signals. The fourth bandpass filter is connected at its output to a fourth mixer 72. The fourth mixer 72 mixes the output of the fourth bandpass filter with the output of a fourth local oscillator 74. This provides signals in a fourth intermediate frequency range which is of the same order as the second intermediate frequency range output by the second mixer 54. The frequency provided by the fourth local oscillator 74 remains constant.

The output of the fourth mixer 72 is input to a fifth bandpass filter 76 which again filters out the noise etc introduced by the fourth mixer 72. The output of the fifth bandpass filter is input to a fourth amplifier 78 which amplifies the signal and inputs it to an analogue to digital converter 80 which converts the analogue signals to digital form. The output of the analogue to digital converter 80 is connected to the input of the scanning receiver 48 which as discussed hereinbefore controls the frequency of the first and second local oscillators 46 and 56.

The purpose of the scanning receiver 48 is to consider the strength of all of the digital signals which it receives from the analogue to digital converter 80. The scanning receiver is arranged to scan all of the signals received within the bandwidth and identify the strongest signal. Once the scanning receiver has identified the strongest signal it sets the frequency of the first local oscillator 46 so that the strongest signal will, when down converted by the first mixer 44, fall within the stopband of the notch filter. The scanning receiver 48 controls the frequency provided by the second local oscillator 56 so that the output of the second mixer 54 is always in the same second intermediate frequency range.

Figure 5A:
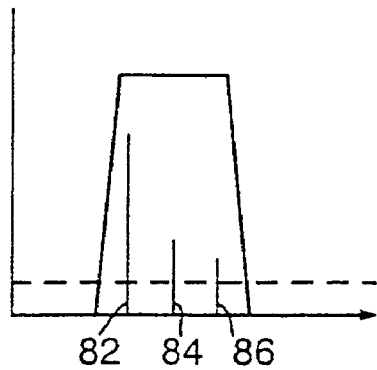
FIG. 5a shows the bandwidth of the first bandpass filter of FIG. 4.

Reference is now made to FIGS. 5a to 5d which shows the bandwidth of a number of the filters. FIG. 5a shows the bandwidth of the first bandpass filter 36. The first bandpass filter 36 is tuned to a radio frequency bandwidth and is wide enough to ensure that all signals within the bandwidth in which signals could be received pass therethrough. The bandwidth may be of the order of 35 MHz in a GSM system which allows the system to be used with any of the available bands. However, in some embodiments the bandwidth may be less than 35 MHz in a GSM system. In that case, the number of available bands with which the receiver can be used is less than N. By way of illustration, the received signal is shown as having three separate channels at different frequencies. The first channel 82 contains a signal having a high amplitude whilst the second and third channels 84 and 86 have much weaker signals.

Figure 5B:
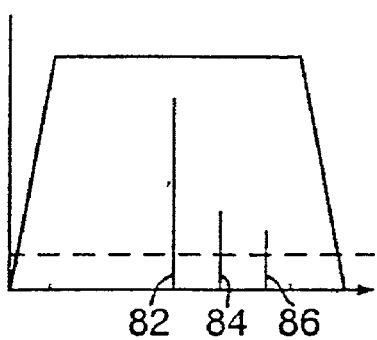
FIG. 5b shows the bandwidth of the second bandpass filter of FIG. 4.

FIG. 5b shows the characteristics of the second bandpass filter 50 which is tuned to the first intermediate frequency range. Since the strongest signal might be located at either end of the bandwidth within which band signals can be received, the second filter 50 may be twice the bandwidth of the third bandpass filter 58. Again it is possible in alternative embodiments of the invention to use a filter with a smaller bandwidth.

In the example shown in FIG. 5a, the strongest signal is shown at one end of the bandwidth of the first filter 36. A consequence of ensuring that the strongest signal is at the frequency of the stopband of the notch filter 52 is that the strongest signal will now be in the middle of the bandwidth of the first of the second bandpass filter 50. This assumes that the stopband of the notch filter is tuned to a frequency falling in the middle of the bandwidth of the second bandpass filter.

Figure 5C:
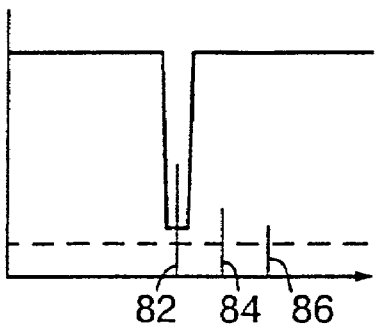
FIG. 5c shows the bandwidth of the notch filter of FIG. 4.

FIG. 5c shows that the notch filter passes all signals therethrough without attenuation except the signals falling within the stopband frequency 88. As can be seen from this figure, the strongest signal 82 is attenuated whilst the other two signals 84 and 86 are not effected.

Figure 5D:
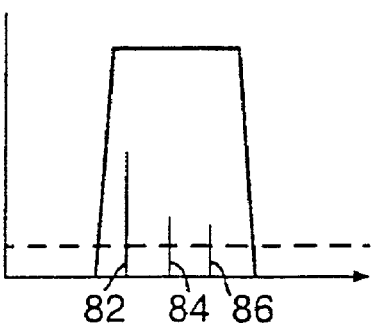
FIG. 5d shows the bandwidth of the third bandpass filter of FIG. 4.

FIG. 5d shows the bandwidth of the third bandpass filter 58. As the frequency of the output of the second mixer is fixed, the third bandpass filter can have the same bandwidth as the first bandpass filter 36 but shifted into the appropriate intermediate frequency range. Again, it is possible in alternative embodiments of the invention to use a filter with a smaller bandwidth. The third bandpass filter 58 sets the bandwidth of the receiver which may be less than the bandwidth of filter 36. It is important that all the desired signals fall with the passbands of filters 50 and 58.

Thus, as can be seen from FIG. 5d, the amplitude of the strongest signal is attenuated so that it is much less and closer to the amplitude of the other signals. This effectively reduces the dynamic range of the signals so that all the signals for example, fall within the dynamic analogue to digital converter 62. It should be appreciated that in the second analogue to digital converter 80, since there are the very strong signals as well as the weaker signals, the weaker signals may be lost in the noise. However, as the scanning receiver is looking only for the strongest signals, this does not cause problems.

Figure 6:
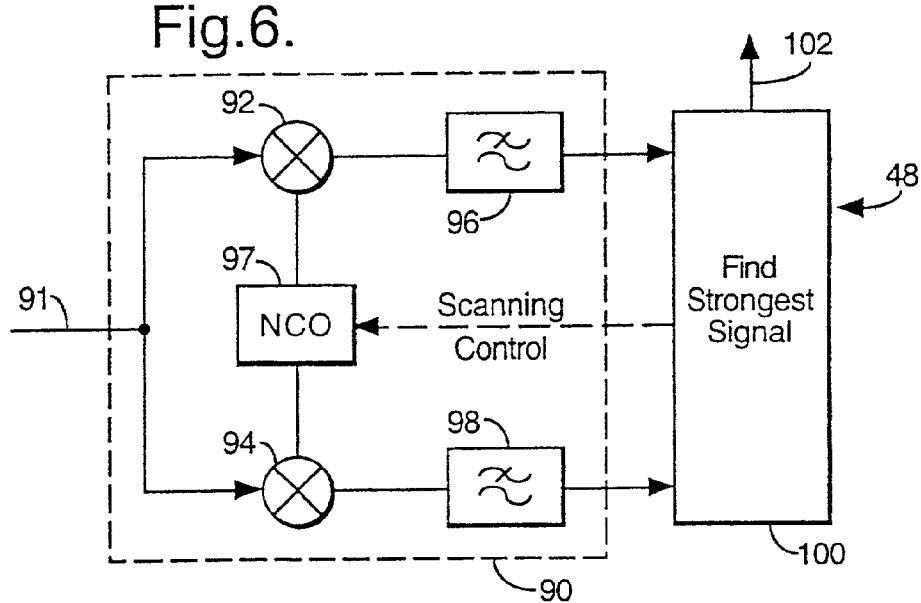
FIG. 6 shows a first scanning receiver for use with the receiver of FIG. 4.

Reference will now be made to FIG. 6 which shows the first scanning receiver.

The first scanning receiver comprises a digital downconverter 90. The digital downconverter has an input 91 for receiving the output of the analogue to digital converter 80. The input from the analogue to digital converter 80 is input to first and second multipliers 92 and 94 respectively. Each of the first and second multipliers 92 and 94 receives an output from an numerically controlled oscillator 97 NCO which provides an output frequency which, when mixed with the signal from the analogue to digital converter 62 produces the in-phase and quadrature phase representations of the desired frequency channel within the pass bands of the low pass filters 96 and 98. The output of each of the first and second multipliers 92 and 94 is input to a low pass filter 96 and 98 respectively. This removes any of the signals which are not at the baseband frequency. The output of the filters 96 and 98 are input to a unit 100 which determines the strength of each of these signals. The frequency of the signal provided by the NCO 97 is controlled by unit 100 so that each of the frequencies contained in the received signal is in turn reduced to the baseband frequency. The unit 100 has a register which stores the strength of each of the signals. The unit 100 compares the signals and identifies the strongest signal and its associated frequency. The unit 100 then provides an output 102 which controls the frequency provided by the first local oscillator 46 so that the strongest signal falls within the stopband of the notch filter 52. The output of the unit 100 also controls the second local oscillator 56 so that the output of the second mixer 54 is at the appropriate intermediate frequency range. It should be appreciated that the first and second multipliers create a complex representation of the input signal. Hence the output of one multiplier represents the I signal whilst the output of the other multiplier represents the Q signal.

Figure 7:
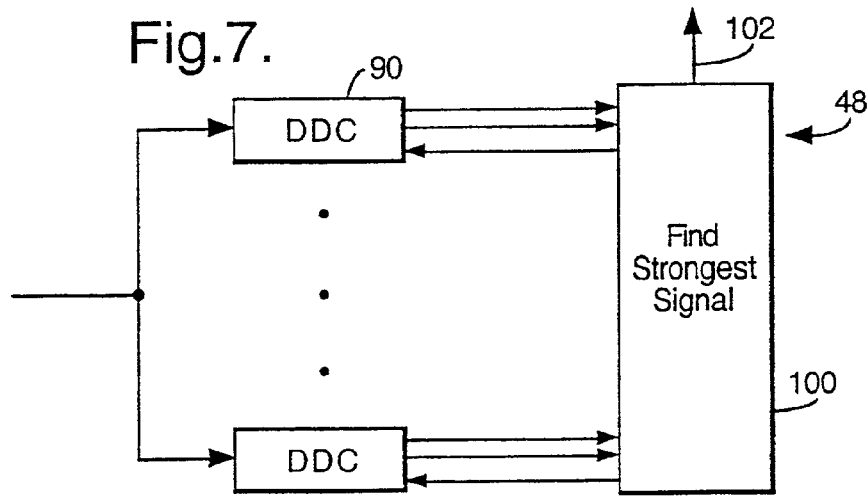
FIG. 7 shows a second scanning receiver for use with the receiver of FIG. 4.

Reference will now be made to FIG. 7 which shows a second scanning receiver 48. This scanning receiver is similar to that shown in FIG. 6. However, a plurality of digital downconverters 90 are provided. Each of the digital downconverters has the same structure as shown in FIG. 6.

Each of the digital downconverters 90 is allocated a different frequency and accordingly downconverts a different one of the signals output from the analogue to digital converter. The unit 100 operates in the same manner as described in relation to FIG. 6.

In the embodiment shown in FIG. 7, the digital downconverters 90 may have a given frequency applied by each oscillator to each multiplier 6. Alternatively, each oscillator may be arranged to scan over a predetermined sub-band of the band width.

Figure 8:
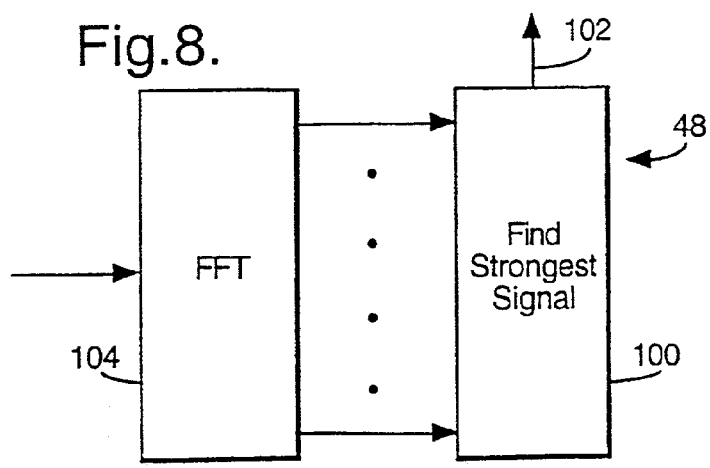
FIG. 8 shows a third scanning receiver for use with the receiver of FIG. 4.

Reference is now made to FIG. 8 which shows a third embodiment of the scanning receiver. The digital downconverter of FIG. 6 and FIG. 7 has been replaced by a Fast Fourier transform unit 104 which extracts frequency domain information. In particular, the Fast Fourier transform unit is arranged to separate the different signals. Separated signals are then input to the unit 100 which determines the strongest signal as with the embodiments shown in FIGS. 6 and 7.

The attenuation of the notch filter is determined by the required analogue to digital converter performance 62. It is aim to keep the attenuation of adjacent channels and hence other signals as small as possible.

In one modification to the embodiment described hereinbefore, the scanning receiver branch ie the path from the output from the coupler 38 to the scanning receiver may only have a single intermediate frequency. In other words, only a single mixer is provided in place of the third and fourth mixers shown in FIG. 4.

The clock rate of the first analogue to digital converter 62 is preferably at least 2.5 times the desired bandwidth, ie the bandwidth within which the signal can be received.

Whilst embodiments of the present invention have been described in relation to a GSM system, embodiments of the present invention can be used with any other suitable standard including analogue standards, other standards using time division multiple access (TDMA), spread spectrum systems such as code division multiple access (CDMA), frequency division multiple access (FDMA), and hybrids of any of these systems. It should be appreciated that whilst the embodiment of the present invention has been described in the context of a GSM system, embodiments of the present invention are particularly applicable to any FDMA system, regardless of whether or not TDMA is also used.

Embodiments of the present invention have been described in the context of a receiver for a base transceiver station. However, embodiments of the present invention can be used in any suitable receiver such as in a mobile station as well as other types of receiver which are not used in cellular networks but which are arranged to receive a number of signals at the same time. The receiver may be a wireless or wired receiver.

Whilst the preferred embodiment of the present invention has been described in the context of a receiver which is able to receive all N channels at the same time, embodiments of the present invention are also applicable to receivers which receive only some (at least two) of the N channels at the same time. A plurality of receivers would be required but the number of receivers required would still be less than N.

The invention claimed is:

1. A receiver for receiving a plurality of different signals at the same time, said receiver comprising:
   means for identifying at least one strongest signal of said plurality of different signals; and
   a filter for attenuating only within a frequency band and adjustable to attenuate only within a frequency band of one of said at least one strongest signal with respect to the other of said plurality of signals, said filter having an input to receive said plurality of different signals and an output providing said plurality of different signals with signals within said frequency band of said one strongest signal being attenuated.

2. A receiver as claimed in claim 1, wherein the plurality of different signals are at different frequencies.

3. A receiver as claimed in claim 1, wherein said filter is a notch filter.

4. A receiver as claimed in claim 1, wherein an analogue to digital converter is coupled to the output of the filter, whereby the at least one strongest signal is in the dynamic range of said analogue to digital converter after being attenuated by said filter.

5. A receiver as claimed in claim 1, wherein a downconverter unit is provided for down converting said signals and the identifying means comprises means for measuring the strength of the signals at a baseband.

6. A receiver as claimed in claim 1, wherein an analogue to digital converter is provided, the digital output of the analogue to digital converter being coupled to the input of said identifying means and the identifying means comprises means for measuring the strength of the digital signals from the analogue to digital converter.

7. A receiver as claimed in claim 1, wherein there is provided an input for receiving said signals, a splitter for dividing said signals, said splitter comprising a first output coupled to said identifying means and a second output coupled to a main signal path which includes said filter.

8. A receiver as claimed in claim 7, wherein the splitter is arranged so that the signals on the first output are much weaker than the signals on the second output.

9. A receiver as claimed in claim 7, wherein said splitter comprises a coupler.

10. A receiver as claimed in claim 1, wherein a downconverter unit is provided for down converting said received signals to an intermediate frequency range, said downconverter unit being arranged to receive a control signal from said identifying means for determining said intermediate frequency range, whereby said intermediate frequency range is determined by said identifying means based on the frequency of the strongest signal.

11. A receiver as claimed in claim 10, wherein a second downconverter unit is provided for downconverting the received signals to a predetermined second intermediate frequency range which is lower than said first intermediate frequency range, said identifying means being arranged to provide a control signal for controlling the second downconverter unit so that the output of said second downconverter unit falls within the predetermined range.

12. A receiver as claimed in claim 11, wherein at least one of said first and second downconverter units comprises an oscillator which is arranged to provide a downconversion signal and the frequency of said downconversion signal is controlled by said identifying means.

13. A receiver as claimed in claim 1, wherein the identifying means comprises a first part for separating said signals and a second part for identifying the at least one strongest signal.

14. A receiver as claimed in claim 13, wherein said first part of said identifying means comprises a fast fourier transform unit for separating said signals.

15. A receiver as claimed in claim 13, wherein the first part of said identifying means comprises a digital downconverter for converting the signals to a baseband.

16. A receiver as claimed in claim 15, wherein the digital downconverter comprises an oscillator, which frequency is altered to provide each of said plurality of signals at a baseband.

17. A receiver as claimed in claim 15, wherein a plurality of downconverters are provided, each downconverter being arranged to convert signals within different frequency ranges to the baseband.

18. A base station incorporating a receiver for receiving a plurality of different signals at the same time, said receiver comprising means for identifying at least one strongest signal of said plurality of different signals, and a filter for attenuating only within a frequency band of said at least one strongest signal with respect to the other of said plurality of signals, said filter having an input to receive said plurality of different signals and an output providing said plurality of different signals with said at least one strongest signal being attenuated.

19. A method for receiving a plurality of different signals at the same time, said method comprising:
identifying at least one strongest signal of said plurality of different signals; and
filtering for attenuating only within a frequency band of said at least one strongest signal with respect to the other of said plurality of signals by a filter having an input to receive said plurality of different signals and an output providing said plurality of different signals with said at least one strongest signal being attenuated with respect to the other of said plurality of signals.

* * * * *